United States Patent [19]
Leech

[11] Patent Number: 5,916,444
[45] Date of Patent: Jun. 29, 1999

[54] METHOD FOR BIOLOGICALLY CLEANSING WATER IN SWIMMING POOLS, PONDS AND THE LIKE BY PROMOTING GROWTH OF BIOMASS

[76] Inventor: David G. Leech, 536 Long Ter., Leesville, S.C. 29070

[21] Appl. No.: 09/013,279

[22] Filed: Jan. 26, 1998

[51] Int. Cl.$^6$ .................................................. C02F 3/32
[52] U.S. Cl. ...................... 210/602; 210/614; 210/631; 210/747; 210/903; 134/32; 134/42
[58] Field of Search ..................... 134/1, 21, 30, 134/42; 210/601, 602, 612, 614, 747, 903, 631

[56] References Cited

U.S. PATENT DOCUMENTS

| | | | |
|---|---|---|---|
| 3,768,200 | 10/1973 | Klock ...................................... | 210/602 |
| 4,005,546 | 2/1977 | Oswald ................................... | 210/602 |
| 5,011,604 | 4/1991 | Wilde et al. ............................ | 210/602 |
| 5,019,173 | 5/1991 | Gettings et al. ........................ | 134/42 |
| 5,766,474 | 6/1998 | Smith et al. ............................ | 210/602 |

*Primary Examiner*—Thomas G Wyse
*Attorney, Agent, or Firm*—Thomas L. Moses

[57] ABSTRACT

A batch process for biologically cleansing water, particularly swimming pool water, by promoting growth of biomass therein, which causes a depletion of the nutrients necessary for future biomass growth. Nitrates are one of the key nutrients necessary for the perpetuation and growth of biomass, or algae, and the object of the process is to promote growth of the biomass until the nitrates have been depleted to an acceptable level. When the nitrate levels reach an optimal level, the biomass is removed from the water, without oxidizing or destroying the biomass, leaving clean water with low nitrate and nutrient levels. This process allows water to be cleansed of the very nutrients that are necessary for algae growth, making the water an inhospitable environment for algae and keeping the water clean and clear. Chemical treatments will require significantly lesser amounts of chlorine and other chemicals required to maintain clean, clear water, after the application of the instant process.

10 Claims, No Drawings

METHOD FOR BIOLOGICALLY CLEANSING WATER IN SWIMMING POOLS, PONDS AND THE LIKE BY PROMOTING GROWTH OF BIOMASS

BACKGROUND OF THE INVENTION

1. Field of the Invention

The present invention relates generally to processes for cleansing water in swimming pools, ponds and the like. More specifically, the present invention includes a process of biologically cleansing water by promoting growth of biomass therein, which causes a depletion of the nutrients necessary for biomass growth. Nitrates are one of the key nutrients necessary for the perpetuation of biomass, or algae, and the object of the process is to promote growth of the biomass until the nitrates have been depleted to an acceptable level. When the nitrate levels reach an optimal level, the biomass is removed from the water, without oxidizing or destroying the biomass, leaving clean water with low nitrate and nutrient levels. This process allows water to be cleansed of the very nutrients that are necessary for algae growth, making the water an inhospitable environment for algae and keeping the water clean and clear. Chemical treatments will require significantly lesser amounts of chlorine and other chemicals to maintain clean, clear water, after the application of the instant process.

Swimming pool owners continually fight a battle against algae and other water contaminants. The swimming pool offers algae a unique environment where water, pollutants, contaminants, chemicals and nutrients are deposited and collected. Nitrogen rich compounds and other nutrients are constantly added to the swimming pool from sources such as fill water, rain water, urine and sweat from swimmers, and decaying leaves and grass clippings. In addition, nutrients may be added directly from lawn and garden fertilizers which may enter the pool from overspray, wind, or surface runoff. Evaporation serves to concentrate these nutrients.

The swimming pool industry routinely utilizes chlorine, oxidizers, or other chemicals for destroying algae and bacteria and thereby ensuring that other natural organisms responsible for recycling nitrogen are not present. However, the chlorine or other oxidizers themselves effectively recycle the nitrogen compounds back to a food source for algae, causing recurring and exacerbated algae problems.

If the increase in these nutrients is not offset by the removal of water from backwashing, draining or splashout, these nutrients begin accumulating. This accumulation eventually results in more difficult algae control. Where this accumulation is slow, the expense in maintaining water quality increases slowly with the gradual increase in algae problems. Rapid accumulation causes sudden problems with persistent algae growth. The nitrate levels recorded in different bodies of water closely correlate to the amount of chlorine, oxidizers and other chemicals necessary to prevent algae growth. Most swimming pools contain nitrate levels between 0 and 20 ppm, although in extreme cases, pools with over 200 ppm have been observed. Although nitrate levels are a key element in algae growth, and their presence is an ideal way to evaluate this procedure, many other nutrients and contaminants will also be removed during the instant process.

2. Discussion of the Prior Art

| | |
|---|---|
| Bernard, et al. | 4,582,600 |
| Hallberg, et al. | 4,683,064 |
| Mordorski, et al. | 4,693,827 |
| Shin, et al. | 5,254,254 |
| Schmid | 5,490,934 |
| Jensen | 5,527,456 |
| Jensen | 5,573,669 |
| Kimmel | 5,670,046 |

Generally, the prior art is directed to the purification of waste and sewage waters rather than swimming pools and ponds, and most of the prior art discloses continuous filter processes rather than batch processes, or they disclose the use of denitrifying organisms, primarily bacteria, which convert nitrate into nitrogen gas. The Bernard reference discloses an apparatus for the growth of biomass from a supply of suitable nutrient wherein the growth is controlled within a reaction vessel, and the end product is used for biological fermentation processes, or to purify sewage and industrial effluents.

The Hallberg patent teaches a process for decreasing the content of nitrate in ground water or surface water, wherein the water containing denitrification organisms is introduced intermittently through a number of injection wells or injection pipes arranged around one or more extraction wells or extraction pipes for purified water. This arrangement creates a continual denitrification zone at a distance sufficiently far from the extraction well or extraction pipe to protect against recontamination.

Mordorski discloses a method for accelerating the startup of biological nitrification systems for wastewater treatment and preventing or reducing the effects of toxic or inhibitory materials or excursions of pH, temperature or dissolved oxygen upon nitrifying organisms. This process is directed toward the reduction of soluble ammonia levels in wastewater to non-toxic, less toxic, or less inhibitory levels.

The Shin reference discloses a biological method for treating wastewater wherein a floating porous biomass carrier is added to a reactor, which is operated under aerobic, anoxic and anaerobic conditions sequentially provided in an appropriate order, depending on the type of pollutant to be treated.

Schmid teaches a process for providing biological denitrification of a previously nitrified wastewater, including the initial step of supplying to a tank an influent including a relatively small concentration of biomass and a fraction of nitrates. Effluent is delivered from the tank, and includes a biomass concentration substantially equal to the influent biomass concentration and is substantially free of nitrates relative to the influent.

The Jensen references disclose an apparatus and method for water purification by culturing and harvesting attached algal communities. This process includes the steps of providing a floway for cleansing the water of a waterway containing nutrients and other pollutants, utilizing growing attached algal turf, which indicates that this is a continuous process, and not a batch style process.

Kimmel teaches a multistage treatment system for treating nutrient-rich water containing nitrogen compounds, phosphorous compounds, and other minerals. The process includes three stages, each stage having a reaction vessel. The first stage contains an insoluble salt for precipitating phosphorous compounds, the second stage contains a microorganism retained on an inert substrate for converting nitrogen compounds, and the third stage separates precipitates from the water.

None of the prior art, however, provides a method for purifying water from a swimming pool, pond or the like, by promoting growth of biomass to the point of nutrient deprivation, eliminating the biomass by harvesting and not oxidizing or destroying the biomass, and thereby eliminating the nutrients which allow the biomass to grow, all in a single batch process.

SUMMARY OF THE INVENTION

Accordingly, it is an important object of the present invention to provide a method of biologically cleansing water in a single batch process to reduce algae and nutrients that feed algae.

Another important object of the present invention is to provide a reliable test to determine whether the biological cleansing process described herein should be applied to a particular body of water, by measuring nitrate levels within the water.

Yet another important object of the present invention is to provide swimming pool owners an inexpensive and effective alternative to costly chemical treatments of the swimming pool water.

Another important object of the present invention is to provide an environmentally friendly method for biologically cleansing a swimming pool, without the use of excessive amounts of chemicals.

Yet another important object of the present invention is to provide an improved water treatment process that is easy to perform, and which overcomes some of the shortcomings of previous water treatment methods.

These and other features, aspects, and advantages of the present invention will become better understood with regard to the following description, and appended claims.

DESCRIPTION OF THE PREFERRED EMBODIMENT

The process described herein may be used at any time for any body of water, but will be described hereafter in terms of cleansing swimming pool water. In order to effectively utilize the following process to cleanse swimming pool water and reduce algae, the first step of the process may be performed during the spring months. By performing the first step in the spring, all of the nutrient debris that has been accumulated over the winter will be removed.

The first step in the cleansing process is to discontinue all algae treatments which might remove algae or otherwise purify the water. Algaecides and oxidizers, such as chlorine, should not be used at any time during the cleansing process.

The next step is to allow algae to grow, which may include aggressively and actively promoting algae growth. There are many ways to promote algae growth, including warming the water, allowing more sunlight to shine on the water, or even adding algae from a nearby pond. During this step of the process, swimming in the water should be discouraged, as an algae laden pool may obscure a swimmer in distress, or may harbor undesirable bacteria and other organisms. Pool water should be circulated during this stage, and the water filter pressure should be monitored and the filter cleaned as necessary because some of the algae mass will accumulate in the filter. As the algae grows, the available nutrients, including nitrates, are consumed by the algae.

The next step is to determine the optimal level of biomass within the water so that the removal of the biomass will leave the least amount of nutrients behind in the water, thereby inhibiting future biomass growth. One method of determining the optimal biomass level is to test the nitrate levels of the water. Nitrate levels are excellent indicators of the likelihood of continued algae growth. In untreated water, as nitrate levels rise, the level of sanitizer consumption also rises. When nitrate levels are low, algae growth is inhibited. Higher nitrate levels exponentially increase the level of algae growth found in bodies of water, which also exponentially increases the amount of chlorine or other sanitizing agents commonly used to battle the algae growth. There are many different types of tests for determining nitrate levels, including but not limited to the brucine test, the dip-strip test, a zinc reduction test, and a cadmium reduction test. All of the above-mentioned tests are known and used in the industry, and need not be explained further herein. Any suitable test may be employed for this purpose. In order to proceed to the next step of the process, the nitrate test should indicate that nitrate levels are as low as possible before continuing on to the next step, because the lower the nitrate levels, the more effective this treatment will be. Although the nitrate levels are an excellent measuring tool to determine the optimal biomass levels for removal, other tests may be used, including a visual determination, so that the biomass is removed upon observation of the deepest green color of the biomass.

The last step in the process is to physically remove the biomass from the water, without oxidizing or destroying the biomass. This step may include skimming, vacuuming, or filtering the algae, but any suitable method may be employed. In order to remove clinging algae from the walls and bottom of a swimming pool, brushing off the algae may be necessary. Chemical agents used to flock the algae or attract algae cells into a larger, more filterable mass may be used, as long as no algae oxidation or destruction takes place. Destruction or oxidation of the algae serves to recycle the nutrients back into the water, ultimately increasing nitrate levels, and retaining favorable conditions for algae growth. The chemical flocking agents will cause the algae coagulation, which will form a silt on the bottom of the pool, facilitating removal by vacuuming or any other suitable method. Filtering out the algae may require filtering aids or clarifiers, in order to achieve maximum filtering efficiency.

After this process has been completed, it may be repeated if necessary, or normal chlorination or water treatment may resume. Although nitrates are described herein as the primary target nutrient for this procedure, there are many other nutrients, such as phosphates, which stimulate algae growth and will be removed during the same process. Indeed, various levels of other chemicals, metals, and contaminates can also be removed from the swimming pool during this procedure, thus offering a reduced algae level and a general water cleansing.

Although this process has been described herein as being primarily designed to eliminate high nutrient levels in pools, its application may be adapted to all water sources including the treatment of drinking water, and ponds. Ponds associated with agricultural areas tend to be most prone to nutrient accumulation and algae bloom.

While a preferred embodiment of the invention has been described using specific terms, such description is for illustrative purposes only, and it is to be understood that changes and variations may be made without departing from the spirit or scope of the following claims.

What is claimed is:

1. A method for using biomass to biologically cleanse water for swimming pools or ponds, said method comprising the steps of:

discontinuing any chemical water treatment;

promoting biomass growth and nutrient consumption within said water;

monitoring said water to determine a minimal nutrient level found therein; and removing said biomass from said water after said minimal nutrient level is reached without oxidizing or destroying said biomass.

2. The method set forth in claim 1, including the step of increasing direct sunlight on said water to promote biomass growth.

3. The method set forth in claim 1, including the step of warming said water to promote biomass growth.

4. The method set forth in claim 1, including the step of adding biomass to said water to help promote further biomass growth and nutrient depletion.

5. The method set forth in claim 1, including the step of adding a chemical flock to coagulate said biomass, thereby causing said biomass to form a silt.

6. The method set forth in claim 5, including the step of vacuuming said coagulated biomass silt.

7. The method set forth in claim 1, wherein said step of removing said biomass includes the step of filtering said biomass out of said water by using filters, filter aids and clarifiers.

8. The method set forth in claim 1, including the step of brushing sides and said bottom of a swimming pool containing said water to free clinging biomass for removal from said water.

9. The method set forth in claim 1, wherein said step of monitoring said water to determine said minimal nutrient level includes the step of testing for nitrate levels.

10. The method set forth in claim 1, wherein the steps of promoting algae growth, monitoring said water, and removing said biomass are all performed in preparation for opening a swimming pool.

\* \* \* \* \*